(12) United States Patent
Surcouf et al.

(10) Patent No.: US 11,153,263 B2
(45) Date of Patent: *Oct. 19, 2021

(54) DELIVERING CONTENT OVER A NETWORK

(71) Applicant: Cisco Technology, Inc., San Jose, CA (US)

(72) Inventors: Andre Jean-Marie Surcouf, St Leu la Foret (FR); William Mark Townsley, Paris (FR); Guillaume Michel Ruty, Paris (FR); Yoann Desmouceaux, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/094,990

(22) PCT Filed: Apr. 18, 2017

(86) PCT No.: PCT/US2017/028051
§ 371 (c)(1),
(2) Date: Oct. 19, 2018

(87) PCT Pub. No.: WO2017/184554
PCT Pub. Date: Oct. 26, 2017

(65) Prior Publication Data
US 2019/0158456 A1  May 23, 2019

Related U.S. Application Data

(60) Provisional application No. 62/324,710, filed on Apr. 19, 2016, provisional application No. 62/324,696, (Continued)

(30) Foreign Application Priority Data

Jul. 20, 2016 (GB) ..................................... 1612588

(51) Int. Cl.
*G06F 16/955* (2019.01)
*H04L 29/08* (2006.01)
(Continued)

(52) U.S. Cl.
CPC ........ *H04L 61/1511* (2013.01); *G06F 16/245* (2019.01); *G06F 16/955* (2019.01);
(Continued)

(58) Field of Classification Search
CPC . H04L 61/25–2596; H04L 43/08–0876; H04L 43/18; H04L 61/6059;
(Continued)

(56) References Cited

U.S. PATENT DOCUMENTS 7,289,504 B1 * 10/2007 Hippelainen ..... H04L 29/12216
370/338
8,260,881 B1    9/2012 Paleja et al.
(Continued)

OTHER PUBLICATIONS

S. Ata, H. Kitamura and M. Murata, "Towards early deployable Content-Centric Networking enhanced by using IPv6," 2013 IFIP/IEEE International Symposium on Integrated Network Management (IM 2013), 2013, pp. 1191-1194. (Year: 2013).*
(Continued)

*Primary Examiner* — David R Lazaro
*Assistant Examiner* — Julian Chang
(74) *Attorney, Agent, or Firm* — Merchant & Gould P.C.

(57) ABSTRACT

A method of delivering content in one or more packets over a network is described. A content request packet comprising a request for content based on a first IPv6 address is received, the first IPv6 address identifying the content. The first IPv6 address is mapped to a second IPv6 address, the second IPv6 address being associated with the content at a physical location. The content requested in the content request packet is then received from the physical location
(Continued)

associated with the second IPv6 address for delivery to a user. A further method includes routing a packet for requesting the content from a client to a content server storing an instant of the content, based on an IPv6 address of content being requested by the client. A communication session is then set up between the client and the content server; and the requested content is transmitted from the content server.

20 Claims, 7 Drawing Sheets

Related U.S. Application Data filed on Apr. 19, 2016, provisional application No. 62/324,657, filed on Apr. 19, 2016, provisional application No. 62/324,727, filed on Apr. 19, 2016, provisional application No. 62/324,721, filed on Apr. 19, 2016, provisional application No. 62/340,156, filed on May 23, 2016, provisional application No. 62/340,182, filed on May 23, 2016, provisional application No. 62/340,162, filed on May 23, 2016, provisional application No. 62/340,174, filed on May 23, 2016, provisional application No. 62/340,166, filed on May 23, 2016.

(51) Int. Cl.

| | |
|---|---|
| *H04L 12/721* | (2013.01) |
| *H04L 12/725* | (2013.01) |
| *H04L 29/12* | (2006.01) |
| *H04L 12/749* | (2013.01) |
| *H04L 12/745* | (2013.01) |
| *H04L 12/747* | (2013.01) |
| *H04L 12/28* | (2006.01) |
| *H04L 29/06* | (2006.01) |
| *H04N 21/2343* | (2011.01) |
| *H04N 21/658* | (2011.01) |
| *H04N 21/643* | (2011.01) |
| *H04N 21/845* | (2011.01) |
| *H04L 12/723* | (2013.01) |
| *H04N 21/262* | (2011.01) |
| *G06F 16/245* | (2019.01) |
| *H04L 12/743* | (2013.01) |
| *H04L 12/26* | (2006.01) |
| *H04L 12/741* | (2013.01) |
| *H04N 21/2662* | (2011.01) |

(52) U.S. Cl.
CPC .... *H04L 12/2803* (2013.01); *H04L 29/06163* (2013.01); *H04L 29/06517* (2013.01); *H04L 29/08045* (2013.01); *H04L 43/0876* (2013.01); *H04L 45/306* (2013.01); *H04L 45/34* (2013.01); *H04L 45/38* (2013.01); *H04L 45/50* (2013.01); *H04L 45/72* (2013.01); *H04L 45/741* (2013.01); *H04L 45/742* (2013.01); *H04L 45/745* (2013.01); *H04L 45/748* (2013.01); *H04L 45/7453* (2013.01); *H04L 45/7457* (2013.01); *H04L 61/103* (2013.01); *H04L 61/15* (2013.01); *H04L 61/1582* (2013.01); *H04L 61/2007* (2013.01); *H04L 61/251* (2013.01); *H04L 61/2503* (2013.01); *H04L 61/256* (2013.01); *H04L 61/304* (2013.01); *H04L 61/6059* (2013.01); *H04L 61/6063* (2013.01); *H04L 63/1416* (2013.01); *H04L 63/166* (2013.01); *H04L 63/168* (2013.01); *H04L 65/4084* (2013.01); *H04L 65/605* (2013.01); *H04L 65/608* (2013.01); *H04L 67/02* (2013.01); *H04L 67/1002* (2013.01); *H04L 67/1008* (2013.01); *H04L 67/2823* (2013.01); *H04L 67/2842* (2013.01); *H04L 67/322* (2013.01); *H04L 67/327* (2013.01); *H04L 69/22* (2013.01); *H04L 69/326* (2013.01); *H04N 21/23439* (2013.01); *H04N 21/26258* (2013.01); *H04N 21/64322* (2013.01); *H04N 21/6581* (2013.01); *H04N 21/845* (2013.01); *H04N 21/8456* (2013.01); *H04L 61/35* (2013.01); *H04L 61/6009* (2013.01); *H04L 65/4007* (2013.01); *H04L 65/602* (2013.01); *H04L 69/329* (2013.01); *H04L 2212/00* (2013.01); *H04N 21/2662* (2013.01)

(58) Field of Classification Search
CPC ......... H04L 61/2503–2592; H04L 45/74–748; H04L 29/12915; H04L 61/00–6095
See application file for complete search history.

(56) References Cited

U.S. PATENT DOCUMENTS

| | | | | |
|---|---|---|---|---|
| 8,861,525 | B1* | 10/2014 | Durand | H04L 61/251 |
| | | | | 370/392 |
| 9,967,734 | B1* | 5/2018 | Bertz | H04W 8/08 |
| 10,230,687 | B1* | 3/2019 | Duleba | H04L 61/6086 |
| 10,424,034 | B1* | 9/2019 | Wang | G06F 21/6254 |
| 10,594,649 | B2* | 3/2020 | Surcouf | H04L 45/741 |
| 11,025,585 | B2* | 6/2021 | Arajo | H04L 67/2842 |
| 2003/0182410 | A1* | 9/2003 | Balan | H04L 67/101 |
| | | | | 709/223 |
| 2004/0184467 | A1* | 9/2004 | Watanabe | H04L 29/12009 |
| | | | | 370/401 |
| 2005/0182829 | A1 | 8/2005 | King et al. | |
| 2005/0283832 | A1* | 12/2005 | Pragada | H04L 29/06027 |
| | | | | 726/12 |
| 2006/0262793 | A1* | 11/2006 | Vare | H04H 20/22 |
| | | | | 370/390 |
| 2008/0071893 | A1* | 3/2008 | Ohhira | H04L 61/35 |
| | | | | 709/222 |
| 2009/0016235 | A1* | 1/2009 | Tokunaga | H04L 12/2818 |
| | | | | 370/252 |
| 2009/0177762 | A1* | 7/2009 | Shiraiwa | H04L 61/35 |
| | | | | 709/220 |
| 2010/0125656 | A1* | 5/2010 | Karasaridis | H04L 67/1008 |
| | | | | 709/224 |
| 2010/0303027 | A1* | 12/2010 | Fernandez Gutierrez | |
| | | | | H04L 29/1232 |
| | | | | 370/329 |
| 2011/0096782 | A1* | 4/2011 | Park | H04L 29/12367 |
| | | | | 370/392 |
| 2011/0153941 | A1* | 6/2011 | Spatscheck | G06F 9/5083 |
| | | | | 711/119 |
| 2011/0154101 | A1* | 6/2011 | Merwe | G06F 11/3006 |
| | | | | 714/5.1 |
| 2011/0252082 | A1 | 10/2011 | Cobb et al. | |
| 2012/0128001 | A1* | 5/2012 | Ooghe | H04L 29/12264 |
| | | | | 370/392 |
| 2012/0173877 | A1* | 7/2012 | Pendakur | G06F 21/10 |
| | | | | 713/169 |
| 2012/0185557 | A1* | 7/2012 | Di Marco | H04L 67/2842 |
| | | | | 709/217 |
| 2012/0287932 | A1* | 11/2012 | Haddad | H04L 45/04 |
| | | | | 370/392 |
| 2013/0003567 | A1* | 1/2013 | Gallant | H04L 41/142 |
| | | | | 370/252 |
| 2014/0082123 | A1 | 3/2014 | Hasuo | |
| 2014/0207957 | A1* | 7/2014 | Zhang | H04L 67/02 |
| | | | | 709/227 |
| 2015/0074286 | A1* | 3/2015 | Anschutz | H04L 45/38 |
| | | | | 709/240 |
| 2015/0215274 | A1* | 7/2015 | Imadali | H04L 61/2038 |
| | | | | 709/245 |

(56) References Cited

U.S. PATENT DOCUMENTS

| | | | |
|---|---|---|---|
| 2015/0312212 A1* | 10/2015 | Holmes | C12Q 1/6876 709/245 |
| 2015/0382184 A1* | 12/2015 | Takazoe | H04W 8/26 370/475 |
| 2016/0021162 A1* | 1/2016 | Surcouf | G06F 16/00 709/219 |
| 2016/0036730 A1 | 2/2016 | Kutscher et al. | |
| 2016/0080445 A1* | 3/2016 | Kazerani | H04L 65/4076 709/219 |
| 2016/0142308 A1* | 5/2016 | Gage | H04L 47/2483 370/392 |
| 2016/0241435 A1* | 8/2016 | Iordache | H04L 41/0823 |
| 2016/0308823 A1 | 10/2016 | Maslak | |
| 2016/0337426 A1* | 11/2016 | Shribman | H04L 65/4084 |
| 2017/0134274 A1* | 5/2017 | Araújo | H04L 45/74 |
| 2017/0134337 A1* | 5/2017 | Araújo | H04L 61/1511 |
| 2017/0153980 A1* | 6/2017 | Araújo | H04L 61/1511 |
| 2017/0155678 A1* | 6/2017 | Araújo | H04L 63/1425 |
| 2017/0155732 A1* | 6/2017 | Araújo | H04L 61/6059 |
| 2017/0302575 A1* | 10/2017 | Ward | H04L 43/0876 |
| 2017/0318112 A1* | 11/2017 | Johnsimon | H04L 67/2814 |
| 2017/0346788 A1* | 11/2017 | Jokela | H04L 12/6418 |
| 2018/0331997 A1* | 11/2018 | Mo | H04L 61/103 |
| 2019/0124040 A1* | 4/2019 | Avula | H04W 76/12 |
| 2019/0158453 A1* | 5/2019 | Ståhl | H04L 12/14 |
| 2019/0230167 A1* | 7/2019 | Laari | H04L 12/66 |
| 2019/0297014 A1* | 9/2019 | Azgin | H04L 49/3009 |

OTHER PUBLICATIONS

L. Heath, H. Owen, R. Beyah and R. State, "CLIP: Content labeling in IPv6, a layer 3 protocol for information centric networking," 2013 IEEE International Conference on Communications (ICC), 2013, pp. 3732-3737, doi: 10.1109/ICC.2013.6655135. (Year: 2013).*

Office Action issued in U.S. Appl. No. 16/094,967, dated Mar. 18, 2021; (13 pages).

* cited by examiner

301

32 bit Label assigned to a device

Fig. 3

DELIVERING CONTENT OVER A NETWORK

TECHNICAL FIELD

The present disclosure relates generally to the field of content delivery, wherein the content is delivered in one or more packets over a network, in particular an IPv6 network.

BACKGROUND

In a traditional IP network, addressing schemes have been established based on the nodes of the network such that individual network nodes have associated local or globally-unique addresses. In a traditional IP network, the most widely used way to deliver multimedia contents from a Content Delivery Network (CDN) to a client is through the use of HTTP servers, which are attached to local and more remote storage from which the content can be retrieved and served via the HTTP server.

BRIEF DESCRIPTION OF THE FIGURES

Embodiments of the method and apparatus described herein are illustrated in the Figures in which:

Figure 3:
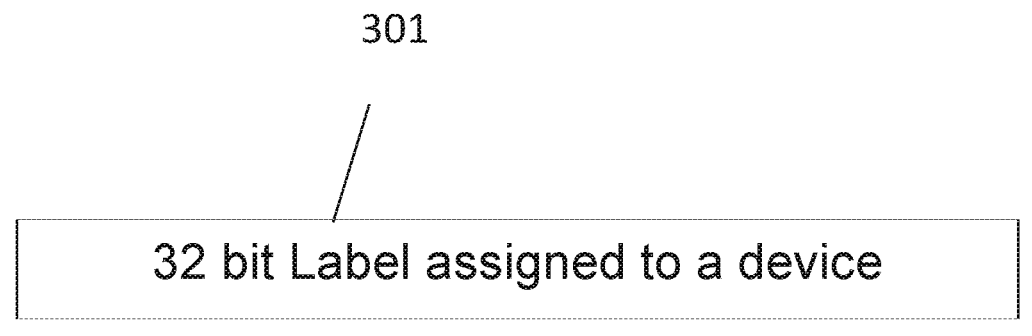

FIG. 3 shows a representation of an IPv4 header;

DETAILED DESCRIPTION

Overview

Figure 1:
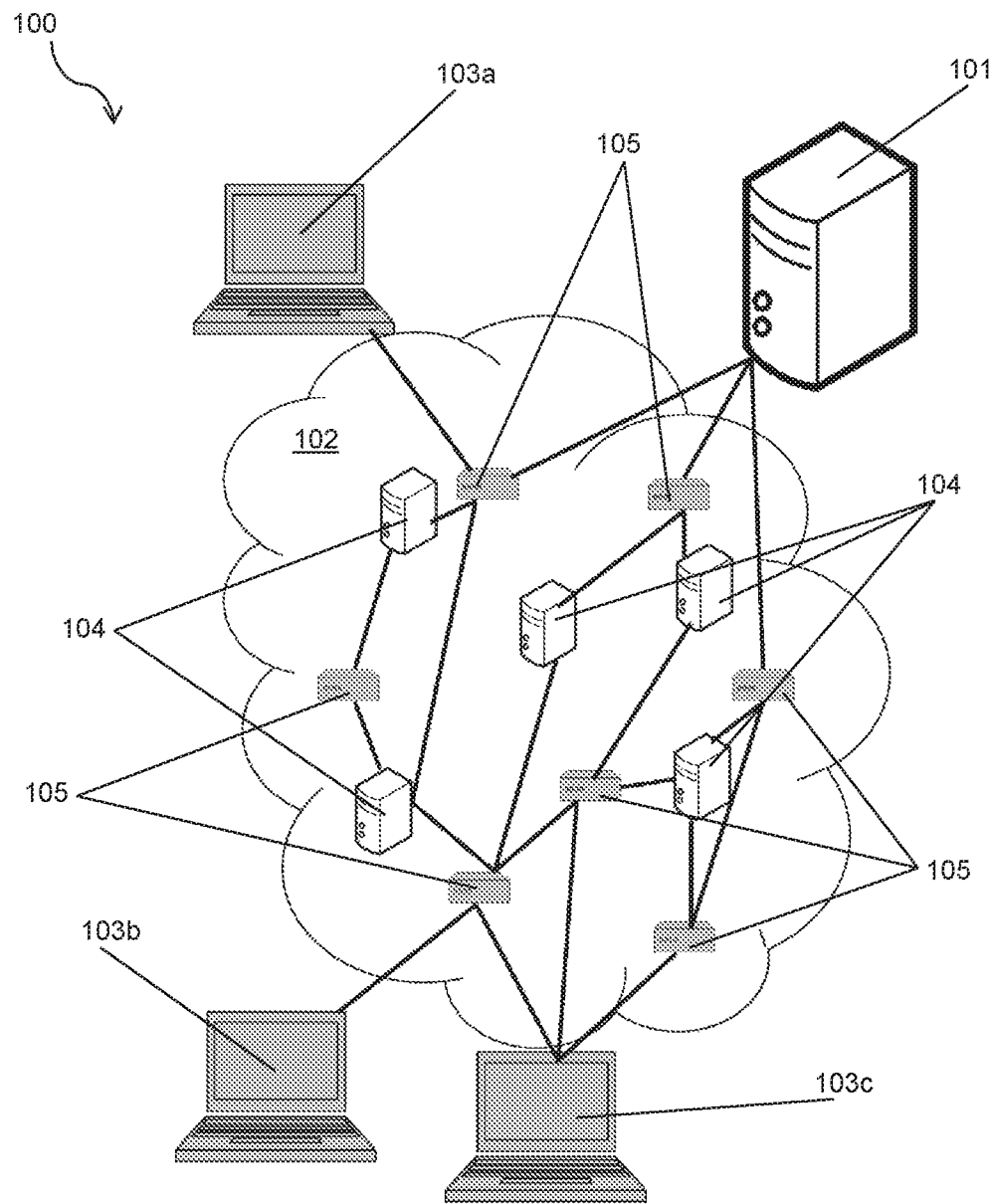
FIG. 1 shows an overview of a network in which embodiments may be implemented.

Described herein is a method of delivering content in one or more packets over a network. The method includes receiving a content request packet comprising a request for content based on a first IPv6 address, the first IPv6 address identifying the content. The first IPv6 address is mapped to a second IPv6 address, the second IPv6 address being associated with the content at a physical location. The content requested in the content request packet is then received from the physical location associated with the second IPv6 address for delivery to a user.

Also described herein is a method of delivering content in one or more packets over a network. The method includes routing a packet for requesting the content from a client to a content server storing an instant of the content, based on an IPv6 address of content being requested by the client. A communication session is then set up between the client and the content server; and the requested content is transmitted from the content server to the client within the communication session.

Apparatus for implementing the methods, including network nodes, computer programs, computer program products, computer readable media and logic encoded on tangible media for implementing the methods are also described.

Example Embodiments

Networks, such as local area networks and wide area networks, can be implemented between nodes or network devices and are often utilised for distributing data for storage within the network device and for later retrieval of that data. One example of a wide area network is the internet. Nodes of the network may request data from one another. They can do this in one of two ways; they can either address a request to another node, the request including details of the data being requested, or they can address a request directly to the required data.

The network forming the internet is made up of a large number of interconnected nodes. These nodes include clients, switches, servers, routers and other such devices and the nodes can communicate using many different protocols at different layers of the OSI model, but in particular the Internet Protocol version 4 (IPv4) communications protocol. Nodes in the network can be addressed using static or dynamic IPv4 addresses, some of which are globally-reachable but many of which are specific to a local network segment.

Internet Protocol version 6 (IPv6) has greatly increased the number of available Internet Protocol (IP) addresses, enabling IP addresses to be utilised in a different way. IPv6 addresses contain 128 bits and the number of unique IPv6 addresses is therefore significantly greater than for 32-bit IPv4 addresses. This means that content, in addition to nodes, can have an IP address; in fact each data item, whether it is a page, article or piece of multimedia content can have its own IP address. This means that rather than traffic being addressed to a specific node, traffic can now be alternatively or additionally addressed to a particular piece of content.

FIG. 1 shows a standard network configuration 100 with clients (or consumers, or users) 103a-c, a main server 101, routers 105 and caches 104. Note that identical numbering has been used for features which are functionally equivalent to one another, e.g. all the caches 104, and all the routers 105. This should be interpreted as meaning that each cache has broadly the same functionality as each other cache, although the exact content stored on each, and the technical capabilities of each may vary. Similarly, each router 105 is arranged to operate in broadly the same way as each other router, and importantly they are all interoperable with each other, but specific functioning and capabilities may vary between routers.

Figure 2:
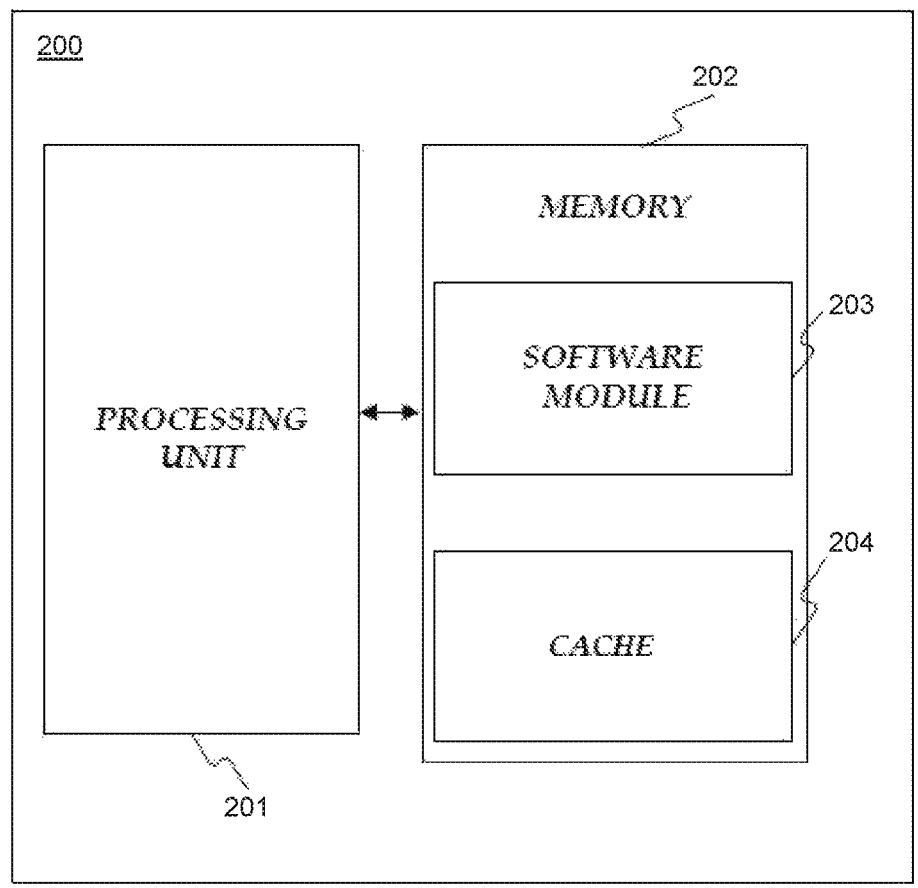
FIG. 2 shows a block diagram representative of a router or server.

FIG. 2 shows a block diagram of a server. The server has within it a cache memory that is used to store content that can be accessed by other nodes on the network. This memory is assigned by several algorithms, most commonly the content most recently requested by one of the end point nodes is stored. FIG. 1 shows these endpoint nodes, which can receive data from a number of servers. If an end point node requests content the server will check its cache to see if it has the content stored; if it does not, it will redirect the request to another node. For example it may redirect the request to a central node that is the provider of the content.

In particular, FIG. 1 shows clients 103a-c and illustrates how they can receive data over a network 102, which could be the internet, for example. A request from a client 103 is forwarded to a cache 104, based on known routing policies. If the cache 104 does not have the exact content requested, it can either redirect the request to another node, for example it may redirect the request to a main server 101 that is the provider of the content.

Typically, routing is performed using Internet Protocol (IP) addresses. The IP version currently in use is IPv4, which uses 32 bits to provide a unique address to every node on a network. This provides a little over 4 billion addresses, and it has been recognised for some time that the rate of growth of the internet is quickly rendering this number inadequate. To solve this problem, a new version of the Internet Protocol has been developed. This new version, IPv6, uses 128 bit addresses, allowing a total of around $3.4 \times 10^{38}$ addresses.

A server usually serves a plurality of endpoint nodes across the network, as is shown in FIG. 1. This means that the server may have to deal with multiple requests at the same time. If these requests together ask for more resources than the server or network (e.g. network bandwidth) can provide, then load balancing may be required. Load balancing is where traffic from nodes is redirected and distributed across a group of servers so that the requests can be fulfilled. It may also be the case that the requests cannot be fulfilled. For example, many nodes may request a high quality of multimedia content and it may not be possible to deliver this simultaneously to all of the nodes. Therefore an inferior level of content may be delivered to at least some of the nodes in order not to overload the network but nevertheless still transmit the content (albeit at a lower quality than requested) to the nodes.

IPv6

IPv6 is an updated version of the internet protocol and is intended to replace IPv4. IPv4 and IPv6 are not designed to be interoperable. IPv6 uses a 128 bit address and these addresses are represented by eight groups of four hexadecimal digits.

IPv6 networks provide auto-configuration capabilities, enabling automatic assignment of an IP address to a device for example based on the device's Media Access Control (MAC) address. IPv6 networks are simpler, flatter and more manageable, especially for large installations. Direct addressing of nodes from anywhere in the network is possible due to the vast IPv6 address space, which enable the use of globally-unique addresses, and the need for network address translation (NAT) devices is effectively eliminated.

An IPv6 address is designed to consist of two parts, a 64 bit prefix that is used for routing and a 64 bit interface identifier. The interface identifier was originally designed to identify a host's network interface, for example by using a hardware address such as the MAC address of the interface. However it has been appreciated that the interface identifier does not have to be used for this purpose. To this end some embodiments described herein utilise the interface identifier to identify content instead. Therefore content will have its own IP address. This means that instead of routing to a particular node in the network, traffic will route to specific content. Large data files such as streams of media content, are often divided into chunks or segments of data as described below and, in this case, each chunk will preferably have its own address.

Figure 4A:
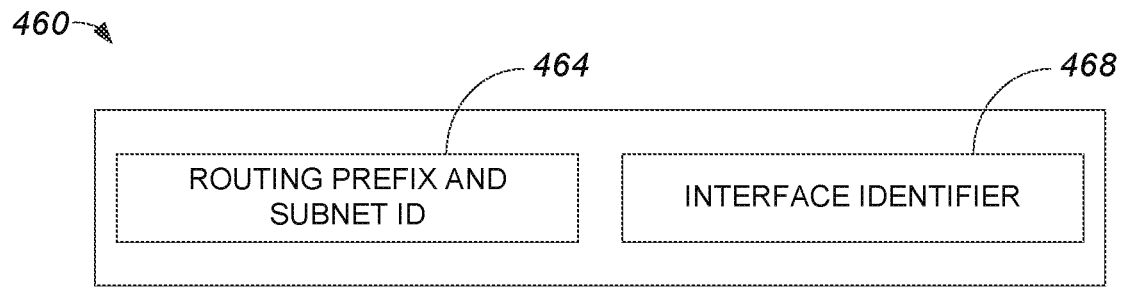
FIGS. 4A-B show diagrammatic representations of an IPv6 address in accordance with several embodiments.

FIG. 4A is a diagrammatic representation of an IPv6 address that may be part of a segment list in a segment routing header in accordance with an embodiment. An IPv6 address 460 may include bits, e.g., 128 bits, substantially divided into a routing prefix and subnet identifier (ID) 464 and an interface identifier 468. In one embodiment, routing prefix and subnet ID 464 includes approximately 64-bits, and interface identifier 468 includes approximately 64-bits. An overall content description may be included in, e.g., coded in, interface identifier 468.

Interface identifier 468 will be described with respect to FIG. 4B in accordance with an embodiment. Interface identifier 468 may include, as shown, a stream type 470a, a service identifier (ID) 470b, a content descriptor 470c, and a chunk descriptor 470d. It should be appreciated that the number of bits included in interface identifier 468 may vary widely, and the number of bits allocated to stream type 470a, service ID 470b, content descriptor 479c, and chunk descriptor 470d may also vary widely, By way of example, interface identifier 468 may include approximately 64-bits, while stream type 470a may include 2-bits, service ID 470b may include 12-bits, content descriptor 470c may include 26-bits, and chunk descriptor 470d may include 24-bits.

Stream type 470a may describe a type of stream, e.g., a type of video stream. Types of streams may generally include, but are not limited to including, linear content such as television or live video content, non-linear content such as video-on-demand, user generated content (UGC), and corporate audio/visual content such as telepresence content.

Service ID 470b may identify service from any source, as for example a provider, an operator, and/or a channel. It should be understood that each source may generally have more than one service ID 470b. In one embodiment, when service ID 470b includes 12-bits, there may be up to approximately 4096 values for service ID 470b that correspond to each stream type 470a.

Content descriptor 470c may generally allow for the management and the identification of content associated with each value of service ID 470b. Examples of a suitable content descriptor 470c will be discussed below with respect to FIGS. 5A-C.

Chunk descriptor 470d is arranged to describe naming conventions for segments which make up, e.g., constitute, content such as a chunk of video. As will be understood by those skilled in the art, chunk descriptor 470d describes naming conventions for segments which make up content. In general, chunk descriptor 470d also facilitates the implementation of caching strategies such as automatic predictive caching. Chunk descriptor 470d may have approximately the same structure as content descriptor 470c, although chunk descriptor 470d and content descriptor 470c generally include different, substantially independent, information.

Figure 5A:
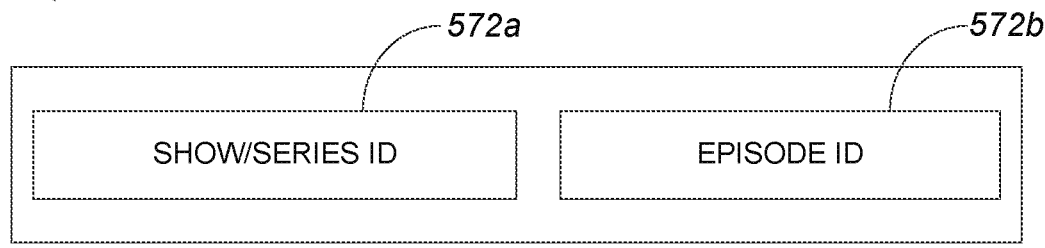
FIGS. 5A-C show diagrammatic representations of suitable content descriptions in accordance with embodiments of the present disclosure.
Figure 5B:
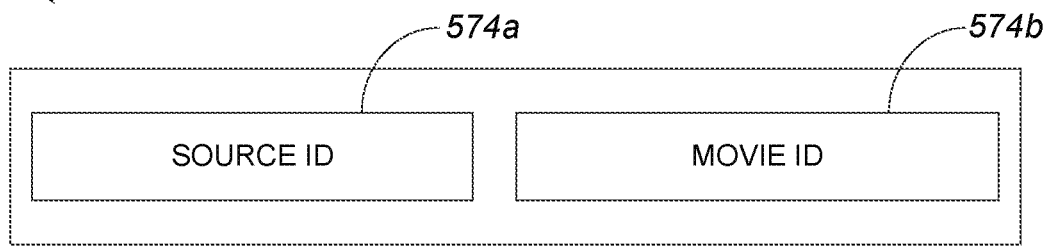
Figure 5C:
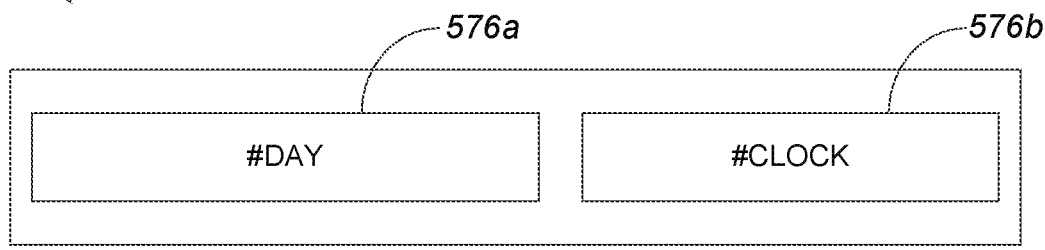

Referring next to FIGS. 5A-C, examples of suitable content descriptors 470c will be described. Using IPv6 address bits as a content descriptor effectively exposes significant properties of content to lower level layers of a network, and may also facilitate the implementation of caching strategies such as automatic predictive caching.

Figure 4B:
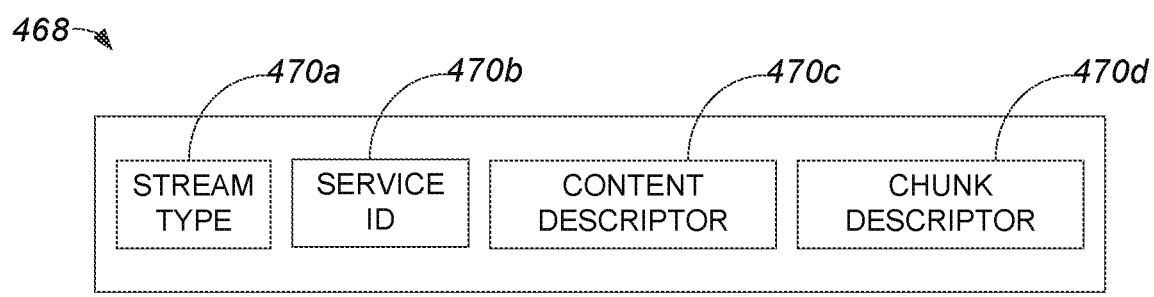

FIG. 5A is a diagrammatic representation of a first suitable content description, e.g., content descriptor 470c of FIG. 4B, in accordance with an embodiment. When content is associated with shows or series associated with a service or channel ID, bits of a first content descriptor 470c' may include a show or series identifier (ID) 572a and an episode ID 572b. The number of bits associated with show or series ID 572a and episode ID 572b may vary widely. In one embodiment, show or series ID 572a may include approximately 16-bits and episode ID 572b may include approximately 10-bits.

When content is associated with movies, a content descriptor 470c" may include a source identifier (ID) 574a and a movie identifier (ID) 574b, as shown in FIG. 5B. In one embodiment, source ID 574 may include approximately 12-bits and movie ID may include approximately 14-bits.

FIG. 5C is a diagrammatic representation of a third suitable content descriptor in accordance with an embodiment. A content descriptor 470c''' may be suitable for managing a flow per minute in a day. Content descriptor 470c''' may include a #day 576a and a #clock 576b. #day 576a identifies a number of days starting from a fixed date, e.g., a conventional fixed date, and #clock 576b identifies a time. In the described embodiment, #day 576a includes approximately 15-bits and #clock 576b includes approximately 11-bits. As #day 576a generally identifies a number of days starting from a fixed date, #day 576a effectively enables an actual date to be determined.

Mapping Database

One node (or distributed system) that may be provided in networks described herein is a mapping database, such as a Domain Name System, DNS. The DNS is a decentralised naming system for nodes connected to the internet. It is used to associate URLs or domain names with IPv4 addresses. DNS can be implemented to work the same way with IPv6, however now it can also associate content, or a combination of content name and URL with an IPv6 address.

The skilled person will appreciate, however, that other mapping databases may be used to implement the methods described herein. A mapping database will typically map a device or content identifier (which may be a text-based identifier of the device or content such as a URL) to an address identifiable in a network (typically a numerical address for the device or content, such as an IPv4 or IPv6 address). As described herein, the address returned by the mapping database may uniquely identify the location of the device or content or may point towards the device or content location (for example, as in segment routing). The address returned may therefore be a complete address associated with the content or device or may be a partial address, such as an IP address including a number of default generic fields.

Segment Routing

One way of requesting content in an IPv6 network is to use segment routing. Segment Routing (SR) allows an IPv6 or Multiprotocol Label Switching (MPLS) packet header to encode a list of explicit waypoints, e.g., multiple nodes, rather than a single destination. Such waypoints may be used to route packets through a specific service or application. Accessing a particular service hosted on any one of a list of servers, however, is time-consuming and inefficient.

Common content streaming systems typically utilize web protocols, as for example a hypertext transport protocol (HTTP), that operates at substantially all application layers. As common content streaming systems rely on Domain Name Service (DNS) and HTTP, Transmission Control Protocol (TCP), and/or Internet Protocol (IP), technical tradeoffs and limitations may result in compromising the quality of streaming content. Common content streaming systems include, but are not limited to including, video streaming systems and audio streaming systems.

Segment Routing (SR) protocol architectures generally provide a tool to help search for content among multiple nodes or networks. In conjunction with the data-centric networking methods described herein, SR allows a shift from substantially centralized delivery of streaming video and single-point fetching to a data-centric object fetch approach at an inter-networking layer. As a result, more efficient streaming systems may be designed.

The general concept of Segment Routing is to allow a set of waypoints to be defined, and as a request traverses the network, a specific function is implemented at that waypoint. To give a specific example, a segment routing request may comprise a series of addresses, and the packet traverses the network, arriving at each address in order (in contrast to the usual shortest, or lowest latency route). One of the addresses may be an address for fetching the requested piece of content, and this is the final destination (e.g. the final address may be an address directly to content, as described herein). Other addresses specify waypoints along the route, at which various functions may be applied, for example service based or topological instructions. Thus Segment Routing v6 enables multiple functions one of which is hunting for directly addressed content.

When SR is used to enable content stored on servers to be provided to a client, a search for a suitable place to open a connection is conducted, and then a connection may be opened at that place so that a network may handle the process of accessing the content.

SR allows an IPv6 or Multiprotocol Label Switching (MPLS) packet header to encode a list of explicit waypoints, e.g., SR nodes, rather than a single destination. Such waypoints or SR nodes may be used to route packets through a specific service or application. For example, SR may route packets to or through a specific aspect of an application and/or a service as long as that specific aspect may be uniquely numbered and represented by an explicit waypoint such as an SR node. An aspect may be, but is not limited to being, a uniquely identifiable chunk of data in a content caching or video delivery application.

Some systems allow IPv6 SR to be used to search for or otherwise hunt for a particular piece of content or service which may reside on substantially any SR-capable waypoint or node running an application that will provide the piece of content or service. Such systems typically rely upon the ability of an SR-capable node to intercept a packet at an intermediate waypoint during a session on the way to a final destination in an SR list. In addition, subsequent packets may reach the same intermediate waypoint without being intercepted by any other waypoints for the life of the session.

In one embodiment, a new mechanism that enables a client to access a service hosted on a list of servers referenced in an SR list is provided. In another embodiment, servers are substantially auto-selected without a client noticing which server has accepted a connection request. SR is used to allow a server selection process to be more automatic and transparent to a client or an endpoint requesting a service.

Specific IPv6 addresses are searched for, or hunted for, along a path of specified IPv6 addresses in an SR list. When a match is found to a specific IP address, the match may correspond to either an application that will result in an instantiation of a new TCP session on a particular node from the SR list, or may be associated with an already existing TCP session. An initial TCP packet may have a different SR list than a subsequent reply and packets thereafter. The ability to direct traffic to a node with a TCP session may be provided in a way that does not require modifications to existing TCP stacks. An IPv6 stack may provide proper primitives to essentially support load balancing of a stateful session such as a TCP session across a set of nodes as defined by an IPv6 SR list. In this example, TCP is an example of a suitable protocol. There are many other connection oriented transport protocols that could be used in place of the commonly used TCP.

A node in the system may be configured to send a packet with a segment routing header populated with the list of addresses attached to the chunk entry from the video description. The packet then goes along the path set by all these segments, and if at any point in the path one of the routers (network endpoints) has the requested chunk, it can terminate the traffic and send the chunk back to the client device. The router therefore may be able to intercept and interpret the packet to detect whether or not it has the requested chunk.

The router may maintain an additional table that represents the "chunk table". When a packet as described above arrives, the router performs a lookup on the chunk table with the last address from the SR list. If there is a match meaning that the chunk is present, the router can terminate the traffic and sends the chunk back to the client. Otherwise, it sends the packet to the next segment in the list. It is not mandatory for a router having the requested chunk to terminate the traffic, this decision can be driven be other considerations such as current workload or other network considerations.

IPv6 SR may also be used for building path-aware geolocation into the routing system. This may allow routers to serve content based on where the content lies, and where the paths content traverses, with the ability to reroute dynamically while including crossing of political and geographical boundaries intact.

Storage and Retrieval of Media Content in a Network

Media content (both audio and video) can be divided into chunks or segments for both storage in and delivery over a network. In that way, for example, media content that can be of many hours duration (such as a film or broadcast of a sporting event) can be divided into a number of segments of shorter playback time (such as between 30 seconds and 5 minutes).

When a network device, such as a client end user device, requests particular media content, such as a particular video file, it may obtain all of the chunks of data that make up that media content.

One way of streaming media content using chunking is to use a technique such as Dynamic Adaptive Streaming over HTTP (DASH), which allows adaptive bit rate streaming of media content, stored as chunks in a network one or more HTTP servers, to a network destination requesting the data.

Prior to storage, the media content is divided into shorter chunks or segments and alternative versions of each chunk are stored at various servers in the network. The alternative versions may be, for example, encoded at different bit rates or may have different formats for playback through a variety of different end user devices (Internet connected TVs, set top boxes, mobile devices including smartphones, laptops etc.)

When the content chunks are created, a DASH manifest file is also created, which identifies the chunks of data necessary to recreate the whole stream of media content, including details of alternative chunks (for example those that are encoded at different bit rates).

Separate DASH manifest files may be created for different formats or encodings of a particular stream of media content, such that a set top box would be working from a different DASH manifest to that used by a smartphone.

The DASH manifest typically also includes an indication of the location of each of the chunks. However, when dealing with consecutive or aggregate chunks, a manifest template can be used to group multiple chunks that follow a regular format into one description. This can enable easier parsing of the manifest file.

Based on the manifest, the end user device can retrieve and reconstruct the full media content at the highest bit rate currently available to it over the network. In particular, the end user device can obtain subsequent chunks identified in the manifest while decoding and displaying a current chunk.

Delivering Media Content to a Client in a Network

When multimedia content is requested from an HTTP server, the ensuing actions typically include: the HTTP server translating the requested URL to map to the local storage backend; the HTTP server scanning its local storage to see if the request is a hit (the data is contained in the server's local storage) or a miss; and in the case of a miss, the HTTP server retrieving the requested data from a more distant location (an intermediate cache further up in the hierarchy or directly a datacenter), perhaps storing it in its local storage (depending on the caching policy), and delivering it to the requesting client.

In the context of a fully distributed storage system, this approach may be inefficient for the following reasons: the overhead that comes with the HTTP protocol may be a concern for performances, both in latency and bandwidth used; the 1:1 association between a local storage and an HTTP server may not be very flexible; the need for the mapping between the storage namespace and HTTP request URLs may also be a concern. Some HTTP lightweight servers exist, but fundamentally these are still HTTP servers but with some other limitations.

In an Information Centric Networking paradigm, addressing in the network is arranged around the information itself. Systems and methods described herein address problems arising from the interaction between IP and ICN networking models. In particular, in an IPv6 Content Networking (6CN) context where URLs are limited to the host part, and there are IPv6 addresses directly representing the requested content, the above complexity is not needed anymore. Embodiments aim at simplifying the whole content delivery chain by getting rid of the HTTP server altogether and providing another, more efficient way of retrieving content data in a 6CN context.

Figure 6:
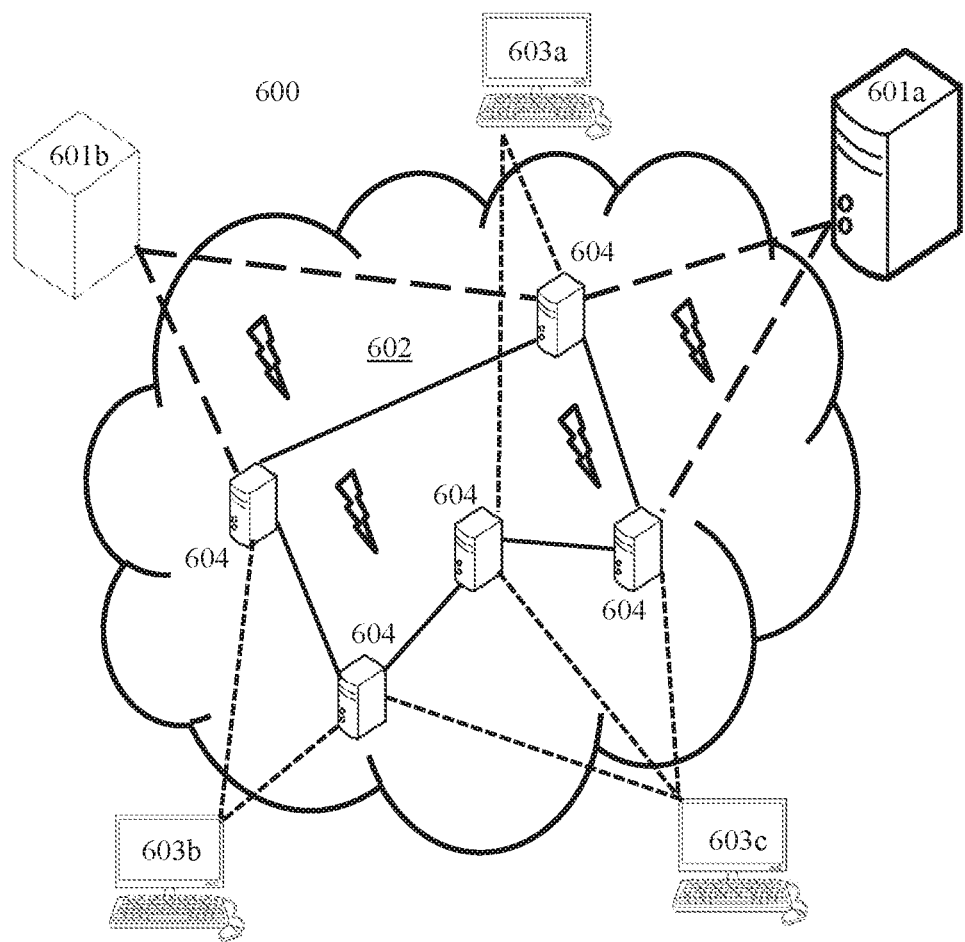
FIG. 6 shows a schematic diagram of a network in which embodiments of the invention may be implemented, comprising an HTTP server, conventional or simplified.

In an IPv6 context, requests for media content can be sent directly to the IPv6 address identifying the requested media content, as described above under the 'IPv6' heading. FIG. 6 shows a network configuration 600 with clients or users 603a-c, an HTTP server 601a, a storage server 601b, and caches 604 within a network 602. The communication links shown are exemplary, but clients 603a-c can communicate with any part of the network, at least via another element in the network, all having access to the servers at least via one or more cache. Each cache in the network can communicate with the other caches in the network. Routers may be present but are not shown.

In a particular embodiment, an object is represented by two types of IPv6 addresses in different namespaces; a URL namespace and a storage namespace. A first type of IPv6 address is the object ID, so representative of a content name. This would typically be the IPv6 address to which the client sends requests when the client wants to retrieve an object, such as a chunk of video. The second is a family of IPv6 addresses, which map directly to a physical content location at which the content is stored, or an "instance" of the content. It is noted that different instances of the content may simply be copies of the master content or may have different properties, for example a particular piece of content may be encoded in different ways and at different resolutions for viewing on different types of device. Each of these IPv6 addresses maps specifically to the content on a particular device, and not generally to the physical storage device itself, so that a request to one of these specific IPv6 addresses only relates to this content on the storage device. These IPv6 addresses may be used to route directly to the content in its physical location.

Therefore, a client wanting to get some data, or content, (for example a chunk of a video), will send a request to the object ID, which is the IPv6 address corresponding to the object. This request is either internally redirected or answered with the address (or addresses) of a replica(s). In the end, the client receives the requested data from the physical location to which the storage system decides to send it from. From an IP point of view, the IP address identified in the answer is the address identifying the Object ID that will correspond to only this content.

Mapping from the object IPv6 ID address to the object IPv6 physical location address can be achieved in several ways. The Object ID to which requests are initially routed may be distributed to the whole storage system. This may prevent the bottleneck of a few HTTP severs serving all the requests; there may be no bottlenecking, in particular at an HTTP server, since every content may be distributed through the server that holds them. Also, since the content may be completely distributed, there may be no single point of failure, and the systems and methods may allow for natural repairability.

The physical content location IPv6 addresses may be the addresses for the main replica of the content in the CDN datacentres, and/or in the intermediate caches where the content is stored. The client request can then be routed to the nearest physical location where the content is stored. This may be done by either the server that purposely sends an appropriate address to the client or by the client itself that selects the nearest address.

Referring to FIG. 6, in an embodiment, a client 603*a* wants to request a chunk of video. The chunk of video has an object ID associated with it, a first IPv6 address, and so based on this address, the client 603*a* sends a data packet out requesting this content chunk, to the HTTP server 601*a*, via a router and/or one or more caches 604 or otherwise. The HTTP server 601*a* maps the object ID to a second IPv6 address that corresponds to a physical location address of an instance of the content chunk being requested. Based on this second IPv6 address, the HTTP server 601*a* directs the request to the storage server 601*b*, which accesses the content chunk being requested from memory, which may be from a cache within the network. This request may be redirected to another cache if the first one to which the request is sent is congested. The content may be distributed throughout the network, as described above, having various instances or replicas, and so the content may be accessed from any one or more of these. Once the server receives the content, the packet is rerouted back to the client 603*a*.

Figure 7:
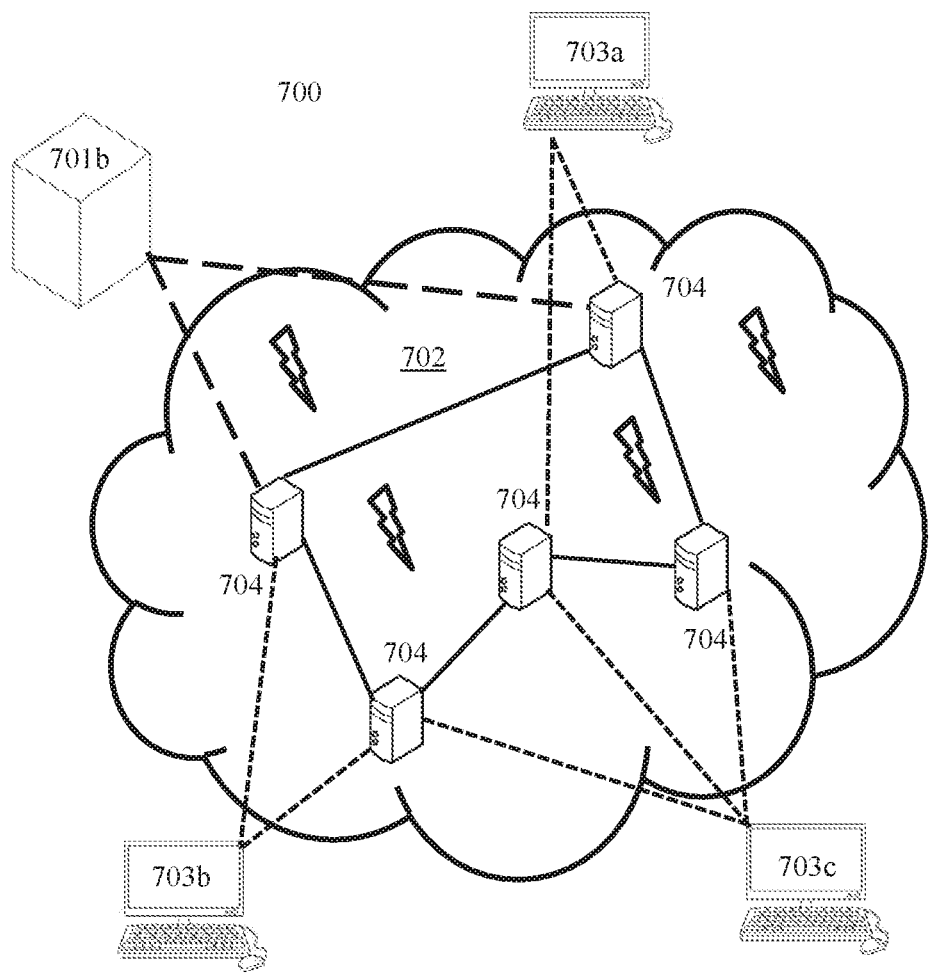
FIG. 7 shows a schematic diagram of a network in which embodiments of the invention may be implemented, with no HTTP server present.

FIG. 7 shows a network configuration 700, differing from network configuration 600 in that no HTTP server is present. Network configuration 700 has clients or users 703*a-c*, a storage server 701*b*, and caches 704 within the network 702. The communication links shown are exemplary, but clients 703*a-c* can communicate with any part of the network, at least via another element in the network, all having access to the servers at least via one or more cache. Each cache in the network can communicate with the other caches in the network. Routers may be present but are not shown.

In the 6CN case shown in FIG. 7, an IPv6 address identifying a content, in particular a video chunk, may take the following form, storage_prefix:video_id:profile:duration:chunk_id. In this form, 'storage_prefix' may be a prefix identifying the storage backend and 'profile' may be an identifier of the quality of the video. Therefore, the content can be accessed directly without requiring any mapping from a first to second IPv6 address, and therefore, without necessitating any intermediary device.

Once the client request is encapsulated within an IPv6 address, there is no need for any mapping between a URL name space and a storage name space. It is therefore possible that the HTTP server can be greatly simplified or even totally removed. If there is no need to go through an intermediate HTTP server, then a reduced number of servers is used in a transaction, reducing the probability for failures or intermediate congestion. An HTTP request sent by a client may take the form, GET http://[prefix::content1]. This 'prefix::content' IPv6 address may correspond to the Object ID as described above.

The simplified version of the HTTP server may simply use this 'prefix::content' address to read the corresponding object from the backend storage and deliver it to the client. From this perspective, the HTTP server may become just a protocol translator between the HTTP protocol and the backend storage.

Removing the HTTP server altogether means that the client may read the data directly from the content ID 'prefix::content' IPv6 address. In this case, a direct link between the client and the server, or cache, holding the relevant data may be set up. The client would therefore just be able to open a TCP socket and read data directly from the server, or cache, storing the content.

Since devices can now directly connect to a 'prefix::content' to get the data, it is possible to more easily load balance the requests across different storage servers. For instance, if the nearest cache to the client is congested and another cache has the content and is not far, a decision could be to delegate the data distribution to the latter. This can be achieved by using classical strategies such as using unicast. For instance, the sending device may itself recognise that the nearest cache is congested, due to a detected latency in dealing with the request or due to monitoring data flow in the network and detecting traffic itself, or due to another device monitoring data flow in the network and detecting traffic, and sending a message to the sending device to suggest a redirection of the request. The sending device may determine another cache that is less congested using similar mechanisms. If redirecting the request, in a redirect message, there may be one or more values inserted in the packet header, one to identify that it is a neighbour redirect message, and another to inform of the other cache. The cache itself may be able to redirect the request to the other cache by similar mechanisms. Every storage node can be included in the distributed storage system (even cache servers), which means the system can be designed without a HTTP server (that may be both a point of failure and a bottleneck) interfacing between the client and the storage plane. This can be highly advantageous.

A CDN working this way reduces the number of data flows. There may be no duplicate flow since a server that holds content that a client has a right to access, can deliver it directly to the client. Indeed, in the traditional way, for every client being served content, a connection is established at least between the HTTP server and the client. If the HTTP server has the content on local storage (cache), this connection may be enough. Otherwise, a second connection is opened between the HTTP server and the backfill server that effectively has the data. This may introduce delays, an unnecessary multiplication of TCP states, undesirable TCP chain effects, an increased bandwidth usage, less flexibility, and a non negligible overhead through the use of the HTTP protocol.

With methods and systems of the present invention delivering content to a client, the method can be very much reduced to the client directly getting the content from the storage (the cache containing the requested content), using the same kind of calls it would use to retrieve it from local storage. This minimises the use of bandwidth and TCP connections. In particular, the HTTP server is not included either in the request path or the content delivery path. Rather, the content is streamed across the network to the requesting node directly from the cache. The HTTP server may be bypassed in that particular content delivery path or may simply not be present in the network at all.

Methods and systems described herein may have interesting properties. Analysing the network traffic directly may yield statistics as to what content is distributed, where, where from and to whom. The usual way through an HTTP server, with the completely separated network namespace and storage namespace, does not give that kind of information granularity that can be achieved with this new approach.

In a 6CN context, using HTTP creates overhead as well as additional, perhaps unnecessary, operational complexity. As will have been made apparent, embodiments propose greatly to simplify the HTTP server or even to remove it. Embodiments yield better performances and allow for a much better granularity of feedback information.

Referring to FIG. 7, in an embodiment, a client 703*a* wants to request a chunk of video. The chunk of video has an IPv6 address associated with it for directly accessing it.

Therefore, the client 703*a* sends a data packet out to this address to directly access the content from a content server 701*b*, perhaps via a router and/or one or more caches 704 or otherwise, and requesting this chunk of video. The content server 701*b* accesses the chunk of video being requested from its local memory, or from a cache 704 within the network. In this respect, a communication session is set up between the client 703*a* and the content server 701*b*. If the content server accesses the chunk of video via a cache 704, the request may be redirected to another cache if the first one to which the request is sent is congested. The content may be distributed throughout the network, having various instances or replicas of the content, and so the content may be accessed from any one or more of these. Once the packet receives the content, the packet is rerouted back to the client 703*a*. Therefore, such methods can be advantageous, since the client can directly access the content from the storage (the cache containing the requested content), using the same kind of calls it would use to retrieve it from local storage. This may require a minimal usage of bandwidth and TCP connections. The method has removed the need for a HTTP server or equivalent to be present.

Any of the above described functionality with regard to IPv6 systems and the retrieval of content as mentioned above can be implemented in these specific embodiments.

The present disclosure also envisages one or more computer programs, computer program products or logic encoded in computer-readable media for implementing any method claimed or described herein. It will be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

Throughout the description, references to components or nodes of the network should be construed broadly, and in particular may comprise several subcomponents or modules working in combination to achieve the stated effects. These subcomponents may themselves be implemented in hardware or software. Likewise, many different components may be combined together as one component, for example a single processor may carry out many functions simultaneously. Similarly, any reference to operational steps may comprise hardware, software, or a combination of the two. As already noted, any method described herein, or any part thereof may be carried out by a computer program, or a computer program product.

References herein to components being connected to one another should be interpreted as meaning either directly connected, or indirectly connected, for example being connected via other components. Indeed, in the case of complex networks, components may be both directly and indirectly connected to one another. Examples of such connection may commonly include, but are not limited to: electronic connections through wires or cables; fibre optic connections; and wireless communication, for example via radio waves, microwaves or infrared.

In the present disclosure, references to networks should be interpreted broadly. In particular, the internet is often used as an example of a network, but is not limiting. The principles set out herein are applicable to all networks, comprising a collection of processors connected to one another. Connection may be direct, or via switches and routers. The network may further comprise servers and caches, depending on the exact nature of the network. When storage is discussed herein, this may include, without limitation one or more of magnetic, optical, solid state, volatile or non-volatile memory.

The steps associated with the methods of the present disclosure may vary. Steps may be added, removed, altered, combined, and reordered without departing from the scope of the present disclosure. Indeed, different aspects and embodiments of the disclosure herein may be combined with one another, in any combination and may be implemented in conjunction with one another in a particular network. In particular, individual components, and systems of components may be combined, the tasks of a single component divided between many subcomponents, or equivalent components interchanged without departing from the principles set out herein. Furthermore, features of one aspect may be applied to other aspects of the system.

Therefore, the present examples are to be considered as illustrative and not restrictive, and the examples are not to be limited to the details given herein, but may be modified within the scope of the appended claims.

The invention claimed is:

1. A method of delivering content in one or more packets over a network, the method comprising:
   receiving a content request packet comprising a request for content based on a first IPv6 address, the first IPv6 address identifying the content;
   mapping the first IPv6 address to a second IPv6 address, wherein the first IPv6 address comprises a first prefix and a first suffix, wherein the first prefix is associated with a first location, wherein mapping the first IPv6 address to the second IPv6 address comprises mapping the first prefix of the first IPv6 address from the first prefix to a second prefix pointing to a second location of the content, wherein the second location is different from the first location, and wherein the first suffix and the second suffix each comprise a content identifier, the content identifier of the first IPv6 address being the same as the content identifier of the second IPv6 address; and receiving the content requested in the content request packet from the second location associated with the second IPv6 address for delivery to a user.

2. The method according to claim 1 further comprising advertising a route to the content using the first IPv6 address.

3. The method according to claim 1 further comprising delivering the content to a requesting user device from the second IPv6 address.

4. The method according to claim 1, wherein the content request packet comprises an HTTP protocol packet.

5. The method according to claim 1, wherein the first IPv6 address comprises: a profile identifying a quality of the content.

6. The method according to claim 1, wherein the second IPv6 address comprises: a profile identifying a storage backend and a profile identifying a quality of the content.

7. The method according to claim 1, further comprising:
determining a congestion level of the second location with access to the requested content; and
in response to determining that the second location is congested, rerouting the packet to a cache with access to the requested content for delivering the requested content.

8. An apparatus for delivering content over a network, the apparatus comprising:
a memory;
a processor connected to the memory, wherein the processor is operative to:
receive a request for content based on a first IPv6 address, the first IPv6 address identifying the content, wherein the first IPv6 address comprises a first prefix and a first suffix, and wherein the first prefix is associated with a first location; and
map the first IPv6 address to a second IPv6 address, wherein the processor being operative to map the first IPv6 address to the second IPv6 address comprises the processor being operative to map the first prefix of the first IPv6 address from the first prefix to a second prefix pointing to a second location of the content, wherein the second location is different from the first location, and wherein the first suffix and the second suffix each comprise a content identifier, the content identifier of the first IPv6 address being the same as the content identifier of the second IPv6 address.

9. The apparatus of claim 8, wherein the first IPv6 address comprises: a profile identifying a quality of the content.

10. The apparatus of claim 8, wherein the second IPv6 address comprises: a profile identifying a storage backend and a profile identifying a quality of the content.

11. The apparatus according to claim 8, wherein the processor is further operative to:
determine a congestion level of the second location of the content;
set up, in response to determining that the second location of the content is congested, a communication session between the client and a third location of the content based on the second IPv6 address;
set up a communication session between the client and the third location of the content; and
transmit within the communication session the requested content from the third location of the content.

12. The apparatus according to claim 8, wherein the content is delivered over the network, without passing through an HTTP server.

13. The apparatus according to claim 8, wherein the second location comprises a cache location of the content.

14. A method of delivering content in one or more packets over a network, the method comprising:
routing a packet for requesting the content, from a client to a content server storing an instant of the content, based on a first IPv6 address of content being requested by the client, wherein routing the packet for requesting the content comprises:
receiving the packet for requesting the content based on the first IPv6 address, the first IPv6 address identifying the content, wherein the first IPv6 address comprises a first prefix and a first suffix, wherein the first prefix is associated with a first location; and
mapping the first IPv6 address to a second IPv6 address, wherein mapping the first IPv6 address to the second IPv6 address comprises mapping the first prefix of the first IPv6 address from the first prefix to a second prefix pointing to a second location of the content, wherein the second location is different from the first location, and wherein the first suffix and the second suffix each comprise a content identifier, the content identifier of the first IPv6 address being the same as the content identifier of the second IPv6 address;
setting up a communication session between the client and the second location of the content; and
transmitting within the communication session the requested content from the second location of the content to the client.

15. The method according to claim 14, wherein the communication session comprises a direct connection between the client and the physical second location of the content storing an instance of the content.

16. The method according to claim 14, wherein the first IPv6 address further comprises a content portion, wherein the content portion identifies content.

17. The method according to claim 14, further comprising:
determining a congestion level of the second location of the content;
in response to determining that the second location of the content is congested, setting up a communication session between the client and a third location of the content based on the second IPv6 address;
setting up a communication session between the client and the third location of the content; and
transmitting within the communication session the requested content from the third location of the content.

18. The method according to claim 14, wherein the content servers in the network comprise a distributed storage system.

19. The method according to claim 14, further comprising analyzing network traffic directly for determining statistics relating to the transmission of content in the network.

20. The method according to claim 14, wherein the content is delivered over the network, without passing through an HTTP server.

* * * * *